March 2, 1965 YOSHINOBU SAKAKI ETAL 3,171,222
SLIDE PROJECTORS
Filed Aug. 14, 1962 2 Sheets-Sheet 1

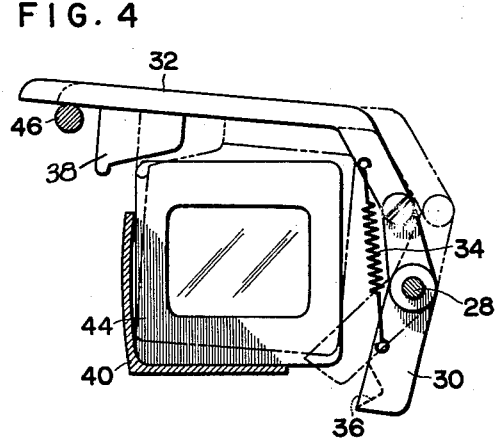
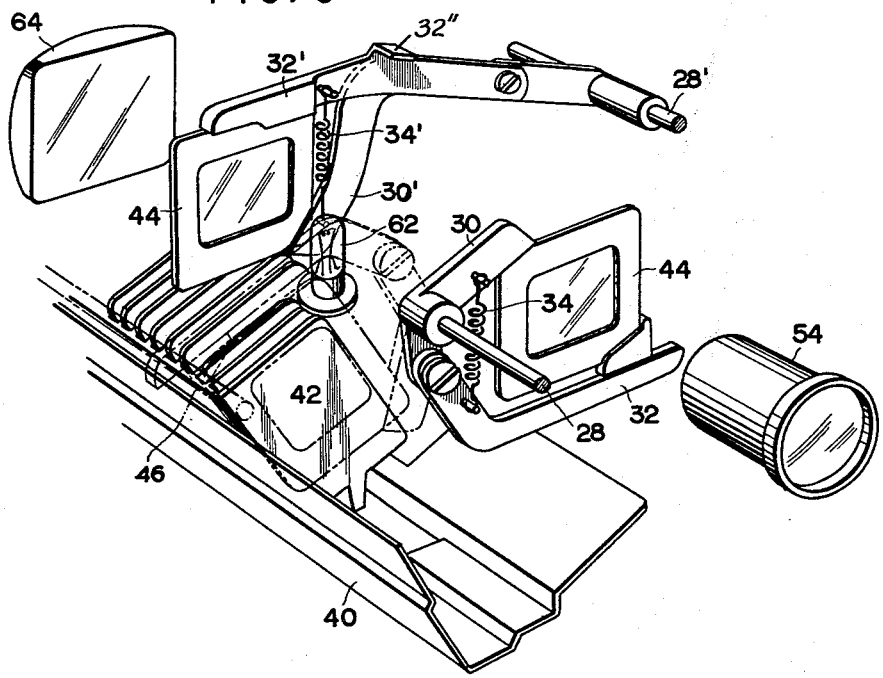

[Patent 3,171,222 — Mar. 2, 1965]

3,171,222
SLIDE PROJECTORS
Yoshinobu Sakaki and Haruo Teshi, Nagoya, Japan,
assignors to Elmo Company, Limited, Nagoya,
Japan, a corporation of Japan
Filed Aug. 14, 1962, Ser. No. 216,907
Claims priority, application Japan, Aug. 20, 1961,
36/30,229
3 Claims. (Cl. 40—79)

This invention relates to a slide projector of the type adapted to automatically transport a set of slide frames into their projection position one frame at a time in succession and to automatically project an information stored on the particular slide frame thus transported onto a projecting screen.

Heretofore, there has been well known the type of slide projector adapted to automatically project, in succession, images on a set of slide frames stowed in a magazine or a carrier, onto a projecting screen by sliding selected one of the slide frames intended to be projected, into its projection position in an optical path of a projecting optical system, projecting the image on the selected slide frame onto a projecting screen, thereafter sliding the projected slide frame back to the carrier along the same path but in the opposite direction to stow the same in its original position, moving the carrier by a distance corresponding to a length of one slide frame, and repeating the abovementioned operations in the named order.

In this case, it is very desirable to observe an image on the next slide frame assigned to be projected, immediately prior to its projection to thereby get ready for explanation of that slide and/or to correct its erroneous position if disposed so.

Further, as well known, any slide to be projected is normally disposed in upside-down state within the associated projecting optical system. According to any known measure, therefore, a set of slide frames had to be initially stowed in upside down state in their carrier. This may occasionally lead to projection of slide frames inside out or laterally reversed.

It is, therefore, an object of the invention to provide in a slide projector an improved device for automatically transporting selected one of a set of slide frames stowed in their carrier, into its projection position and returning the same back to its original position in the carrier after the completion of projecting operation.

It is a more special object of the invention to provide a slide projector of the type adapted to include a set of slide frames stowed in their carrier in erect state or in such a manner that they see in their normal state with the naked eye of an operator and also to include means whereby any slide frame assigned to be projected can be observed immediately prior to its projection.

These objects and other objects which will become apparent as the following description proceeds are accomplished by the provision of a slide projector according to the invention comprising a pair of opposed jaws operative to normally grasp a slide frame to be projected therebetween by the action of a spring serving to bias one of said jaws toward the other jaw, and means for effecting reciprocally rotational movement of said jaws with said slide frame carried by the same, within limits of rotation. Preferably, a continuously rotational movement of a driving shaft at a low speed may be converted into such reciprocally rotational movement of the jaws. When the jaws reach one of said limits of rotation, they disengage from said slide frame and remain to be stationary for a certain period of time. During this period of time a slide carrier within which a set of slide frames are stowed in erect position is longitudinally displaced by a distance corresponding to a length of one slide frame and thereafter said jaws engage and transport the next slide frame to be projected into its projection position disposed on the other limit of rotation with the slide frame inverted. Then the slide frame can be projected by a light source onto a projecting screen. After the completion of projecing operation, the slide frame is returned back to its original position within the slide carrier.

According to another feature of the invention a mechanism for preliminarily observing a slide frame prior to its projection can be provided in such a position that the same can engage a slide frame in the slide carrier succeeding a slide frame transported into its projection position by the abovementioned jaws. This mechanism can similarly transport a slide frame but with the slide frame erected. After the slide frame has been observed it can be transported into its projection position by the jaws previously described.

The invention will become more readily apparent from the following description taken in conjunction with the accompanying drawings in which:

FIG. 4 shows an elevational view of the jaws of FIG. 3 in their two operative positions; and FIG. 5 shows a perspective view of a mechanism for preliminarily observing a slide frame immediately prior to its projection and illustrating spatial relationship among the mechanism, slide frames and a projecting optical system.

Figure 1:
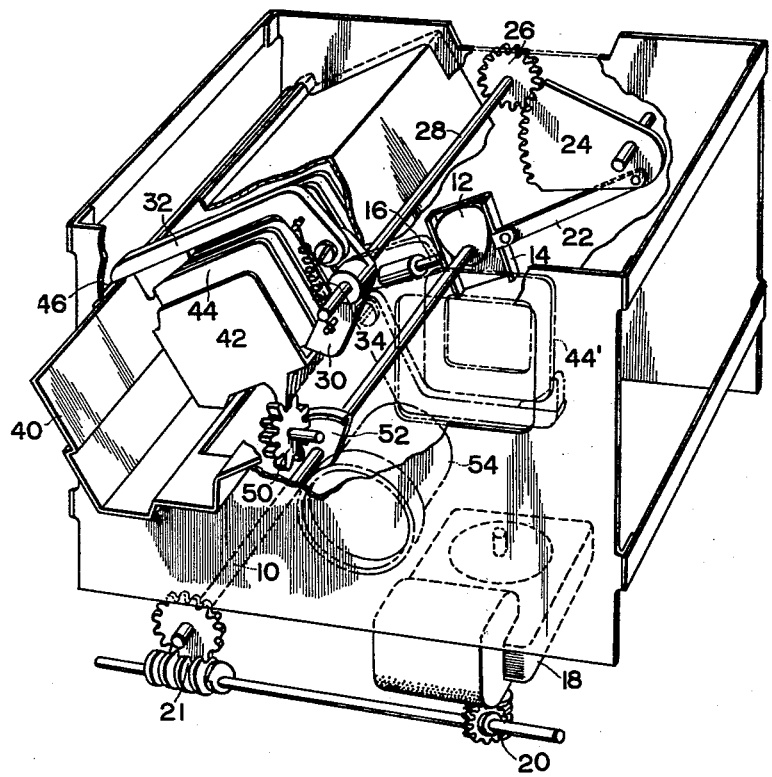
FIG. 1 shows a perspective view of a slide transporting device constructed in accordance with the teachings of the invention with a mechanism for preliminarily observing a slide frame prior to its projection and those portions of the device having no direct bearing upon the invention being omitted or illustrated by phantom line.

Referring now to FIG. 1 of the drawings, there is illustrated a device for automatically transporting slide frames from their stowed positions to their projection position and vice versa in succession according to the teachings of the invention. A driving shaft 10 is provided at one end with a cam of approximately triangular shape 12 engaging a cam follower 14 which, in turn is slidably carried by a cam follower shaft 16. As shown by phantom line in FIG. 1, the driving shaft 10 is coupled to a drive such as an electric motor 18 through a speed reduction gearing illustrated as including a pair of worm gearings 20 and 21 connected to each other. Mounted on the cam follower 14 is a link 22 at one end and a pivotally mounted toothed sector 24 is pivotally secured at a point offset from its center to the other end of the link 2. The toothed sector 24 meshes with a pinion 26 affixed to a reciprocally rotatable shaft 28.

With the arrangement above described it will be seen that when the electric motor 18 is being operated the driving shaft 10 is rotated at a predetermined low speed causing the cam follower 14 to be reciprocally moved in the direction of the axis of the cam frame shaft 16 through rolling engagement of the outer periphery of the triangular cam 12 with a pair of opposed sides of the cam follower 14. This reciprocal movement of the cam follower 14 causes rocking movement of the toothed sector 24 which, in turn, effects reciprocal rotational movement of the pinion 26 and hence of the rotatable shaft 28 to which the pinion is secured. Thus the rotational movement of the driving shaft 10 is converted into the reciprocal rotational movement of the shaft 28.

From the foregoing, it will be appreciated that, as the rotatable shaft 28 is reciprocally rotated by the rotational movement of the triangular cam 12 that the shaft 28, once having reached the extremity of either rotational movement is not immediately rotated in the opposite direction but has a certain period of time during which the same remains stationary. This period may be called hereinafter a quiescent period.

Figure 3:
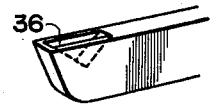
FIG. 3 shows a fragmental perspective view of a free end portion of a jaw for carrying a slide frame.

The reciprocally rotatable shaft 28 is provided with jaw means near that end portion thereof remote from the pinion 26. As best shown in FIG. 4, the jaw means include a jaw 30 rigidly secured to the rotatable shaft 28 and an auxiliary jaw 32 pivotably mounted at one end to the jaw 30 in opposed relationship and biased toward the same by the action of spring 34 having both ends suitably hooked to the jaws 30 and 32 respectively. The jaw 30 has in its free end portion a V-shaped groove 36 as shown in FIG. 3 and the auxiliary jaw 32 has near its free end a tab 38 provided at its extremity with a V-shaped groove identical to the groove 36 on the jaw 30. These two grooves are adapted to normally engage two diagonally opposed corners of any slide frame to be projected whereby the jaws 30 and 32 can normally grasp that slide therebetween.

As shown in FIG. 1, a slide carrier 40 is disposed in substantially parallel relationship to the reciprocally rotatable shaft 28 for longitudinal movement. The slide carrier 40 is of generally angular shape and includes a plurality of parallel partitions 42 extending at equal intervals from both sides of the carrier and at right angles to the same to form a plurality of compartments in which slide frames 44 to be projected can be stowed, one for each compartment. Alternatively, the slide frames may be stowed in a plurality of parallel grooves formed on both sides of the carrier.

Assuming now that the reciprocally rotatable shaft 28 is being rotated counterclockwise as viewed in FIGS. 1 and 4, the auxiliary jaw 32 will abut against a stop 46 (see FIGS. 1 and 4) to be blocked against further movement while the jaw 30 continues to be rotated against the action of the spring 34 until it reaches the limit of counterclockwise rotation determined by the rolling engagement of the triangular cam 12 with the cam frame 14. At that time the jaw 30 will disengage from the particular slide frame 44 now engaging the same and the auxiliary jaw 32 will already be disengaged from that slide frame 44 because it is blocked by abutment with the stop 46. Thus the slide carrier 40 is not prevented from being displaced.

In FIG. 4, the dotted-and-dashed line indicates the respective positions of the jaws 30 and 32 relative to the associated slide frame 44 at the instant the auxiliary jaw 32 has contacted the stop 46 while solid line indicates their positions relative to the slide frame 44 after the rotatable shaft 28 has effected further rotational movement to fully disengage the jaw 30 from the slide frame.

It is recalled that by the action of the triangular cam 12 the reciprocally rotatable shaft 28 remains stationary for the quiescent period after it has reached the limit of rotation. Therefore, the slide carrier can be freely moved during the quiescent period.

The quiescent period during which the reciprocally rotatable shaft 28 remains stationary, that is to say, the slide carrier 40 is not prevented from longitudinally moving is utilized to longitudinally displace the slide carrier a distance corresponding to a length equal to the width of the compartment formed therein in order to get ready for engagement of the jaws 30 and 32 with the next slide to be projected. To this end, the slide carrier 40 is provided on the underside with a longitudinal rack 48 adapted to mesh with a pinion 50 which, in turn, can engage a segmental cam member 52 once for each complete revolution of the driving shaft 10 and for the quiescent period as above described. As clearly shown in FIG. 2, the pinion 48 can engage the segmental cam member 52 rigidly secured to the driving shaft 10 by the bent over cam surface of the cam member 52 being inserted between any pair of adjacent teeth on the pinion 50. The bent over cam surface of the cam member 50 has its circumferential length substantially corresponding to the speed of rotation of the driving shaft 10 multiplied by the quiescent period and has its radius gradually increased or decreased, as the case may be, from one end toward the other end of the cam member 52.

With the arrangement, it will be appreciated that, as the driving shaft 10 is rotated the bent over cam surface of the segmental cam member 52 slides between the associated pair of teeth of the pinion 50 to turn the same because of the varying radii of the cam surface. This turning movement of the pinion 50 causes longitudinal displacement of the slide carrier 40 through the rack 48 which displacement terminates upon disengaging of the pinion 50 from the cam member 52.

Figure 2:
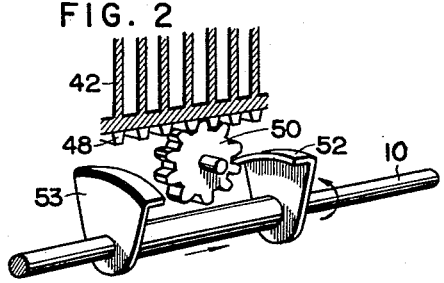
FIG. 2 shows a perspective view of a mechanism for longitudinally displacing a slide carrier.

In order to longitudinally displace the slide carrier 40 a distance corresponding to the width of the compartment formed therein during a period of time beginning at engagement of the pinion 50 with the segmental cam member 52 and terminating at disengagement of the pinion from the cam member 52, it is preferred that, with the rack 48 having its pitch equal to the width of the compartment, the radius of the bent over cam surface at one end is different from that at the other end by a length corresponding to an advancing distance of one tooth on the pinion 52. For example, if the radius of cam the surface at the lefthand end as viewed in FIG. 2 is larger than that at the righthand end by the length just described then the rotation of the driving shaft 10 in the direction of arrow illustrated in FIG. 2 causes the longitudinal displacement of the slide carrier 40 in the rightward direction by the distance corresponding to the width of the compartment in the slide carrier with the result that the next slide frame 44 to be projected is ready for engagement by the jaws 30 and 32. The cam surface of the cam member 52 may have, for example, its profile of Archimede's spiral shape.

In order to longitudinally displace the slide carrier 40 in the leftward direction another segmental cam member 53 identical to the segmental cam member 52 is mounted on the driving shaft 10 in opposed relationship to the cam member 52 with the pinion 52 disposed therebetween and can be brought into engagement with the pinion 50 by axially displacing the shaft 10 by any suitable operating means (not shown).

After the quiescent period has expired, the reciprocally rotatable shaft 28 will start to be again rotated in the opposite direction or in the clockwise direction as viewed in FIG. 1 causing the jaw 30 to reach the lower end of a slide frame 44 to be projected whereupon the lower corner of the slide frame engages the V-shaped groove 36 formed in the free end of the jaw 30. Then as the rotatable shaft 28 is rotated the jaw 30 with the slide frame 44 carried by the groove 36 is continued to be raised until the diagonally opposed corner of the slide frame engages the V-shaped groove on the auxiliary jaw 32. Thus the jaws 30 cooperates with the auxiliary 32 to hold the slide 44 therebetween under the action of the spring 42 with the two diagonally opposed corners of the same engaging the V-shaped grooves in the jaws 30 and 32 respectively. Further rotational movement of the shaft 28 causes the clockwise rotational movement of the slide frame 44 thus held by the cooperating jaws 30 and 32 until the slide frame is transported into a predetermined projection position corresponding to the limit of clockwise rotational movement. After the slide frame held by the jaws 30 and 32 has reached its projection position illustrated by dotted line 44' in FIG. 1, a shutter mechanism (not shown) is opened permitting the information on the transported slide frame to be projected by a light source (not shown) through a projecting objective illustrated by dotted line 54 onto a projecting screen (not shown).

It is understood that the angle at which the slide frames are inclined to the vertical when they are stored in slide carrier 40 and the magnitude of rotational movement of the jaws are selected such that the upper and lower edges of the slide frame are substantially horizontal in its projection position.

It is to be noted that since a slide transferred into its projection position through long rotational movement about the shaft 28 is inverted as in the conventional projector that the slide frame should be stowed in the erect position within the slide frame should be stowed in the erect position within the slide carrier 40.

It is to be understood that, upon transferring the slide 44 into its projection position 44' the driving shaft 10 should be stopped by disengaging the same from the rotary shaft of the motor 18 through actuation of any suitable clutch (not shown). Alternatively, the driving shaft 10 may be stopped by opening a circuit for energizing the motor 18.

After the projection of the slide frame has been terminated the driving shaft 10 can again be driven by engaging the same with the rotary shaft of the motor 18 through actuation of the clutch or by closing the circuit for energizing the motor whereby the slide frame will be stowed in its original position within the slide carrier 40 through rotational movement of the jaws 30 and 32 about the shaft 28 in a direction opposite to that above described in conjunction with the transportation of the slide from its stowed position to the projection position.

As soon as the slide has been stowed in the slide carrier, the reciprocally rotatable shaft 28 has the quiescent period as previous described and the segmental cam member 52 will be initiated to engage the pinion 50 causing the slide carrier 40 to be longitudinally displaced a distance corresponding to the width of a slide carrier compartment in the manner previously described. Thereafter the operation thus far described is repeated whereby the set of slide frames in the slide carrier 40 are successively projected one at a time.

According to another feature of the invention a mechanism for preliminarily observing a slide frame prior to its projection can be provided in such a position that the mechanism can engage a slide frame in the slide carrier succeeding a slide frame being engaged by the transporting device previously described. It will be now described in conjunction with FIG. 5 of the drawings.

In FIG. 5 there is shown one portion of the transporting device previously described and involving a slide frame 44 in its projection position behind a projecting objective 54. A mechanism for preliminarily observing a slide frame prior to its projection includes a jaw 30' rigidly secured to a reciprocally rotatable shaft 28' which, in turn is operatively connected through a coupling (not shown) to the reciprocally rotatable shaft 28 previously described, and an auxiliary opposed jaw 32' pivotably mounted to the jaw 30' and biased toward the same by the action of a spring 34', each component being substantially identical in construction and operation to the corresponding component of the slide transporting device previously described. On the auxiliary jaw 32' is a laterally projecting ear 32" adapted to engage an abutment (not shown) just before the slide frame 44 comes to rest in the slide carrier 40 to stop auxiliary jaw 32' and allow the frame to drop into the carrier. When a driving shaft (which is shown by the reference numeral 10 in FIG. 1) is rotated the reciprocally rotatable shaft 28' is rotated in a similar manner to the the shaft 28 except that shaft 28' rotates through a smaller rotational angle than shaft 28. To move a slide frame 44 to the viewing position, the reciprocally rotatable shaft 28' will start to rotate in the clockwise direction as viewed in FIG. 5, causing the jaw 30' to engage the lower free corner of the slide frame 44. As the rotatable shaft 28' is rotated further, the jaw 30, with the slide frame 44 engaged therein is raised until the top edge engages in a groove in the auxiliary jaw 32'. The jaws 30' and 32' cooperate to hold the slide frame 34 therebetween under the action of the spring 34' with the jaw 30' engaging a lower corner of the slide frame and the jaw 32' engaging the top edge of the slide frame. Further clockwise rotation of the shaft 28' moves the slide frame 44 until it reaches the position shown in FIG. 5. After the slide frame has been viewed with the aid of the light 62 and the viewing lens 64, counterclockwise rotation of the shaft 28' causes the reverse action of the jaws 30' and 32' the projecting ear 32" engaging a stop to stop movement of the jaws 32' and permit the slide frame 44 to drop into the storage position in the carrier 40. The remainder of the movement of shaft 28' removes jaw 30' from the lower corner of the slide frame 44. Therefore, the mechanism for preliminarily observing a slide is operated in a similar manner to that already described in conjunction with FIGS. 1 to 4 except that the angular distance through which a slide frame is displaced is shorter than in the previous case.

As shown in FIG. 5, the observing mechanism holds the associated slide 44 in its observation position when the preceding slide 44 is maintained in its projection position by the transporting device. The slide frame in its observation position is preferably in the erect state. Therefore, the angle at which the stowed slide is stored is inclined to the vertical and the magnitude of short rotational movement of the jaws 30' and 32' are selected so that the upper and lower edges of the slide frame are substantially horizontal in its observation position. The slide frame 44 held in its observation position is illuminated by a light source shown as an electric lamp 62 and can be viewed through a magnifying lens 64.

After the projection of a slide frame is terminated it will be returned to its original position within a slide carrier 40 and simultaneously the slide frame in the observation position will also be stowed in its original position within the slide carrier whereupon the slide projector has the quiescent period during which the slide carrier is advanced. The slide frame which was formerly engaged by the observing mechanism is now carried by the jaws 30 and 32 of the transporting device.

From the foregoing it will be appreciated that the invention has provided an automatic slide projector of the type capable of automatically displacing a slide carrier a distance corresponding to the width of a slide storage compartment one at a time and transporting a slide frame from an erect position within the slide carrier into its projection position while changing it into inverted position and thereafter stowing the slide frame in its original erect position within the slide carrier. Also there has been provided a mechanism for preliminarily observing a slide prior to its projection in its erect position.

While the invention has been described in conjunction with certain preferred embodiments thereof, it is to be understood that various changes in detail of the construction and the combination and arrangement of parts may be made without departing from the spirit and scope of the invention.

What we claim is:

1. In a slide projector, the combination of slide frame grasping means consisting essentially of a lower jaw adapted to engage one lower corner of a slide frame, an upper jaw pivoted to said lower jaw and adapted to engage the diagonally opposite corner of the slide frame, and spring means connected between the jaws and biasing them toward each other, said combination further comprising slide frame rotating means on which said lower jaw is fixedly mounted, reciprocating drive means coupled to said rotating means for rotating said rotating means through at least 180° about an axis perpendicular to the plane in which said jaws lie from a storage position of a frame to the projection of a frame, a slide carrier positioned adjacent the frame grasping means and adapted to store slide frames in the erect position in which they can be grasped by said frame grasping means, and an upper jaw engaging member above said slide carrier against which said upper jaw abuts as said jaws reach the slide storage position to stop movement of said upper jaw while said lower jaw moves to the end of the movement of said rotating means, whereby the upper jaw is released from the slide frame just before it moves into the slide carrier and the lower jaw moves away from the slide frame in the carrier to the end of its rotational movement, thereby leaving the slide in the slide carrier free from engagement of the jaws so that the slide carrier can be moved to advance the next slide frame to be grasped into position between the jaws.

2. The combination as claimed in claim 1 in which said rotating means is a shaft, and said lower jaw is mounted on said shaft at a point intermediate of the length of said jaw, and said upper jaw is pivoted to the end of said lower jaw remote and from the end adapted to engage the slide frame, and said slide carrier is positioned immediately adjacent said jaws so that the slide frame engaging end of said lower jaw just clears the edge of said slide carrier in its rotational movement, said slide carrier being elongated and having an L shaped cross section with the base portion of the L being shorter than the slides which the carrier is adapted to hold.

3. The combination as claimed in claim 1, in which said slide carrier is positioned more than 180° from the projection position and is rotated slightly from the horizontal position about the longitudinal axis thereof, and said combination further comprising an additional slide grasping means consisting essentially of a further lower jaw adapted to engage one lower corner of a slide frame, a further upper jaw pivoted to said further lower jaw and adapted to engage an opposite corner of the slide frame, and further spring means connected between the jaws and biasing them toward each other, and said combination further comprising a further rotating means on which said further lower jaw is fixedly mounted, said further rotating means being coupled to said reciprocating drive means for rotating said additional slide grasping means through an angle from the position of the slide carrier to a position in which a slide frame will be completely out of the slide carrier and substantially horizontal and upright for viewing.

References Cited by the Examiner

UNITED STATES PATENTS

| | | | |
|---|---|---|---|
| 2,477,786 | 8/49 | Bruen | 40—79 X |
| 2,909,098 | 10/59 | Briskin et al. | 40—79 X |
| 2,968,993 | 1/61 | Briskin et al. | 40—79 X |
| 2,984,151 | 5/61 | Halahan et al. | 40—79 X |
| 3,038,373 | 6/62 | Kaden | 40—79 X |
| 3,067,650 | 12/62 | Pester | 40—79 X |
| 3,079,840 | 3/63 | McMaster et al. | 40—79 X |

JEROME SCHNALL, *Primary Examiner.*

E. V. BENHAM, *Examiner.*